(12) United States Patent
Osuka

(10) Patent No.: US 10,868,960 B2
(45) Date of Patent: Dec. 15, 2020

(54) IMAGING APPARATUS

(71) Applicant: Panasonic Intellectual Property Management Co., Ltd., Osaka (JP)

(72) Inventor: Kyosuke Osuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/449,411

(22) Filed: Jun. 23, 2019

(65) Prior Publication Data

US 2020/0007785 A1   Jan. 2, 2020

(30) Foreign Application Priority Data

Jun. 27, 2018 (JP) .................. 2018-122137

(51) Int. Cl.
*H04N 5/232* (2006.01)
*G06F 3/0484* (2013.01)

(52) U.S. Cl.
CPC ... *H04N 5/232411* (2018.08); *G06F 3/04847* (2013.01); *H04N 5/23212* (2013.01); *H04N 5/23229* (2013.01)

(58) Field of Classification Search
CPC ................................. H04N 5/232411

USPC ........................................................ 348/349
See application file for complete search history.

(56) References Cited

U.S. PATENT DOCUMENTS 6,778,770 B1* 8/2004 Cazier ..................... G03B 7/26
                                                              348/372
2008/0111886 A1* 5/2008 Bai ....................... H04N 5/144
                                                              348/173

FOREIGN PATENT DOCUMENTS

| JP | 2003-289471 A | 10/2003 |
| JP | 2004-334209 A | 11/2004 |
| JP | 2008-078738 A | 4/2008 |

\* cited by examiner

*Primary Examiner* — Joel W Fosselman
(74) *Attorney, Agent, or Firm* — Renner, Otto, Boisselle & Sklar, LLP

(57) ABSTRACT

An imaging apparatus allows a user to register a setting of a predetermined function. The imaging apparatus includes a storage part configured to store setting information including a base setting which is a content of the setting registered by the user regarding the setting of the predetermined function; and a controller configured to change the setting information in accordance with an instruction by the user, and thereafter, to return a content of the changed setting information to the base setting at a predetermined timing. The controller sets a predetermined timing based on an instruction by the user.

10 Claims, 12 Drawing Sheets

| Event | Setting Value |
|---|---|
| Switch My Photo Style | ON |
| Sleep Mode | OFF |
| Power Switch | OFF |

Call / Registration

Call Registered Contents
Register Present Contents
Change Name
Return to Default Setting

IMAGING APPARATUS

BACKGROUND

1. Technical Field

The present disclosure relates to an imaging apparatus having a function that can be customized by a user regarding a setting of a predetermined function.

2. Related Art

JP 2004-334209 A discloses a method related to control of a control setting of a camera. Specifically, JP 2004-334209 A discloses a control method for a camera. The control method includes a step of determining an elapsed time from power-off in the camera when the camera is powered on, a step of returning at least one control setting to a continuous value when the elapsed time is shorter than a predetermined threshold. The method further includes a step of returning at least one control setting to a default value when the elapsed time is longer than the predetermined threshold.

SUMMARY

The present disclosure provides an imaging apparatus capable of returning a changed setting to an original setting at the time of customization, at a timing desired by a user, when the user further temporarily changes the customized setting in accordance with the user's preference.

According to a first aspect of the present disclosure, there is provided an imaging apparatus that allows a user to register a setting of a predetermined function. The imaging apparatus includes a storage part and a controller. The storage part is configured to store setting information including a base setting which is a content of the setting registered by the user regarding the setting of the predetermined function. The controller is configured to change the setting information in accordance with an instruction by the user, and thereafter, to return a content of the changed setting information to the base setting at a predetermined timing. The controller sets a predetermined timing based on an instruction by the user.

According to the present disclosure, a changed setting can be returned to an original setting at the time of customization at a desired timing when the user further temporarily changes the customized setting in accordance with the user's preference, and the convenience of the user can be improved.

DETAILED DESCRIPTION OF EMBODIMENTS

Embodiments will be described in detail below with reference to the drawings as appropriate. However, the detailed description may be omitted if necessary. For example, detailed description of already well-known matters and redundant description of substantially the same configuration may be omitted. This is to avoid the following description from becoming unnecessary redundant and to facilitate understanding by those skilled in the art. In addition, the inventor(s) provides the accompanying drawings and the following description to enable those skilled in the art to sufficiently understand the present disclosure, which does not intend to limit the claimed subject matter.

First Embodiment

[1-1. Configuration]

Figure 1:
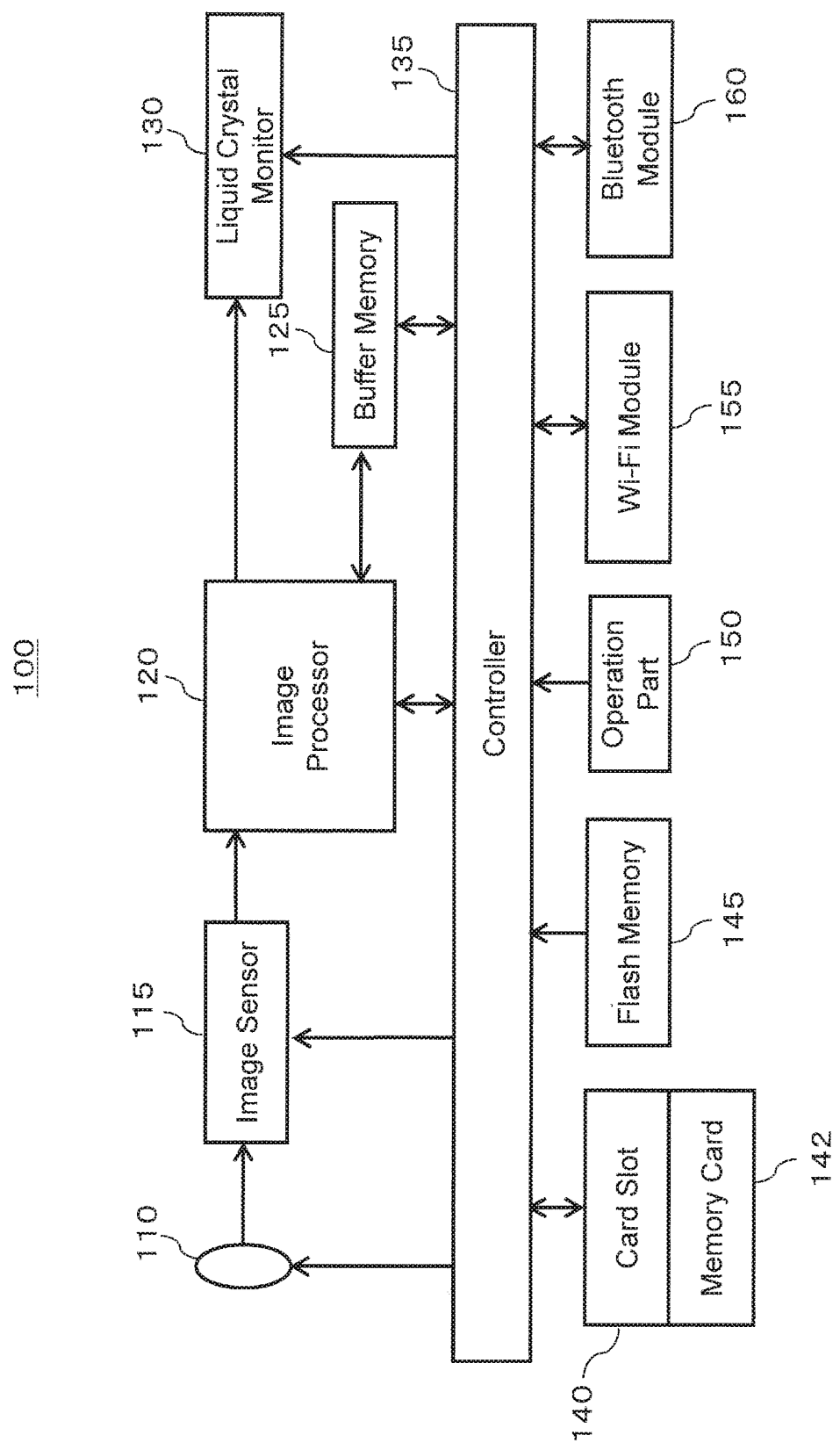
FIG. 1 is a block diagram showing a configuration of a digital camera according to an embodiment of the present disclosure.

FIG. 1 is a diagram showing a configuration of a digital camera according to an embodiment of the present disclosure, A digital camera 100 captures an object and generates image data. In particular, the digital camera 100 according to the present embodiment has a function that allows a user to customize various settings (control parameters) in accordance with the user's preference.

The digital camera 100 captures an object image formed via an optical system 110 with an image sensor 115 and generates image data. An image processor 120 performs various types of processing on the imaging data generated by the image sensor 115 to generate image data. A controller 135 records the image data generated by the image processor 120 in a memory card 142 mounted in a card slot 140. Further, the controller 135 may display (reproduce) the image data recorded in the memory card 142 on a liquid crystal monitor 130 in accordance with an operation of an operation part 150 by the user.

The optical system 110 includes a focus lens, a zoom lens, an optical image stabilizer (OIS), an aperture, a shutter, and the like. The various lenses included in the optical system 110 may be composed of any number of lenses or any group.

The image sensor 115 captures an object image formed via the optical system 110 to generate imaging data. The image sensor 115 generates image data of a new frame at a predetermined frame rate (for example, 30 frames/second). The generation timing of imaging data and an electronic shutter operation in the image sensor 115 are controlled by the controller 135. The image sensor 115 may use various image sensors such as a CMOS image sensor, a CCD image sensor, or an NMOS image sensor.

The image processor 120 performs various types of processing on the imaging data output from the image sensor 115 to generate image data. Further, the image processor 120 performs various types of processing on the image data read out from the memory card 142 to generate an image to be displayed on the liquid crystal monitor 130. Examples of various types of processing include white balance correction, gamma correction, YC conversion processing, electronic zoom processing, compression processing, expansion processing, and the like, but the various types of processing are not limited thereto. The image processor 120 may be constituted of a hardwired electronic circuit, or may be constituted of a microcomputer using a program, a processor, or the like.

The liquid crystal monitor 130 is provided on the back surface of the digital camera 100. The liquid crystal monitor 130 displays an image based on the image data processed by the image processor 120. Instead of the liquid crystal monitor, another monitor such as an organic EL monitor may be used.

The controller 135 includes a CPU and integrally controls the operation of the entire digital camera 100. The controller 135 may include, instead of the CPU, a processor configured with dedicated electronic circuits designed to achieve a predetermined function. That is, the controller 135 can be achieved by various processors such as a CPU, an MPU, a GPU, a DSU, an FPGA, and an ASIC. Controller 135 may be configured with one or more processors. The controller 135 may be configured with one semiconductor chip together with the image processor 120 and the like. Although not shown, the controller 135 incorporates a ROM. In addition, various programs such as auto focus control (AF control) executed by the controller 135 are stored in the ROM. Further, the controller 135 incorporates a RAM (not shown) that functions as an operation region of the CPU.

The buffer memory 125 is a storage medium that functions as a work memory of the image processor 120 and the controller 135. The buffer memory 125 is realized by a dynamic random access memory (DRAM) or the like.

The card slot 140 is a unit in which the detachable memory card 142 is inserted. The memory card 142 can be connected to the card slot 140 electrically and mechanically. The memory card 142 is an external memory internally provided with a storing element such as a flash memory. The memory card 142 can store data such as image data generated by the image processor 120.

A flash memory 145 is a non-volatile storage medium.

The operation part 150 is a general term of hard keys such as operation buttons and operation levers exteriorly mounted on the digital camera 100, and receives operations by the user. The operation part 150 includes, for example, a release button, a mode dial, and a touch panel. When the operation part 150 receives an operation by the user, the operation part 150 transmits an operation signal corresponding to the user operation to the controller 135.

A Wi-Fi module 155 is a communication module (circuit) that performs communication in accordance with the communication standard IEEE 802.11 or the Wi-Fi standard. The digital camera 100 can communicate with other devices equipped with the Wi-Fi module via the Wi-Fi module 155. The digital camera 100 may communicate directly with other devices via the Wi-Fi module 155 or may communicate with other devices via an access point.

A Bluetooth module 160 is a module (circuit) for performing communication in accordance with the communication standard 802.15.1, that is, the Bluetooth (registered trademark) standard. The digital camera 100 can perform communication conforming to the Bluetooth standard with other devices via the Bluetooth module 160.

[1-2. Operation]

Hereinafter, the operation of the digital camera 100 having the above configuration will be described.

Figure 2:
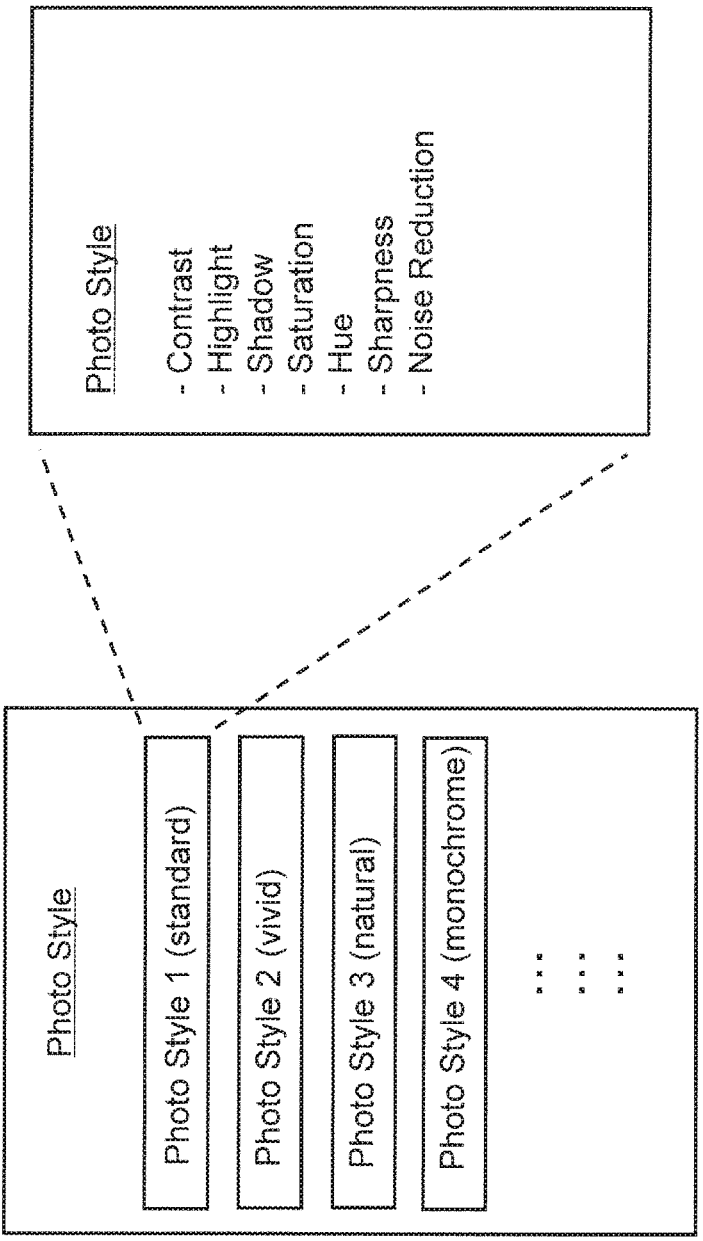
FIG. 2 is a diagram explaining a photo style.

The digital camera 100 according to the present embodiment has a plurality of shooting modes prepared in advance so that the user can easily shoot an image with a desired color tone and image quality. Hereinafter, this shooting mode is called "photo style". For example, as shown in FIG. 2, photo styles such as "standard", "vivid", "natural" and "monochrome" are prepared. "Standard" is a standard setting, and "vivid" is a mode that provides high saturation, high contrast, and vivid effects. "Natural" is a mode in which the contrast is low and a soft effect is obtained. "Monochrome" is a mode for obtaining a monochrome effect without tint.

When one photo style is selected, various control parameters are set such that an image having an effect indicated by the photo style is captured. Specifically, for each photo style, values of control parameters of contrast, highlight, shadow, saturation, hue, sharpness, and noise reduction are set so as to obtain an effect indicated by each photo style.

In the digital camera 100 according to the present embodiment, control parameters such as contrast and saturation can be changed for each photo style in accordance with the user's preference. The setting obtained by changing the control parameter of the photo style prepared in advance in accordance with the user's preference can be registered in the digital camera 100 as "my photo style". In the present embodiment, up to 10 my photo styles can be registered (by way of example and not limitation).

Figure 3:
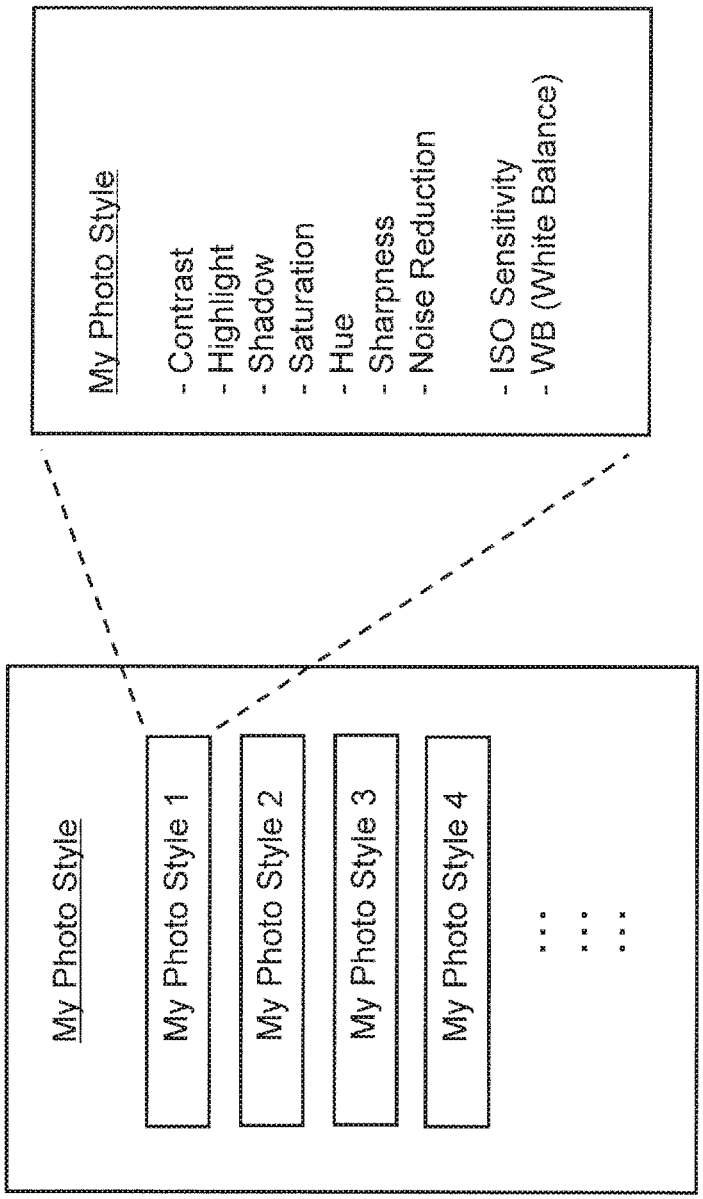
FIG. 3 is a diagram explaining a my photo style.

FIG. 3 is a diagram explaining the my photo style. In the my photo style, in addition to the control parameters of contrast, highlight, shadow, saturation, hue, sharpness, and noise reduction, control parameters of ISO sensitivity and white balance (WB) can be set to values desired by the user.

Figure 4:
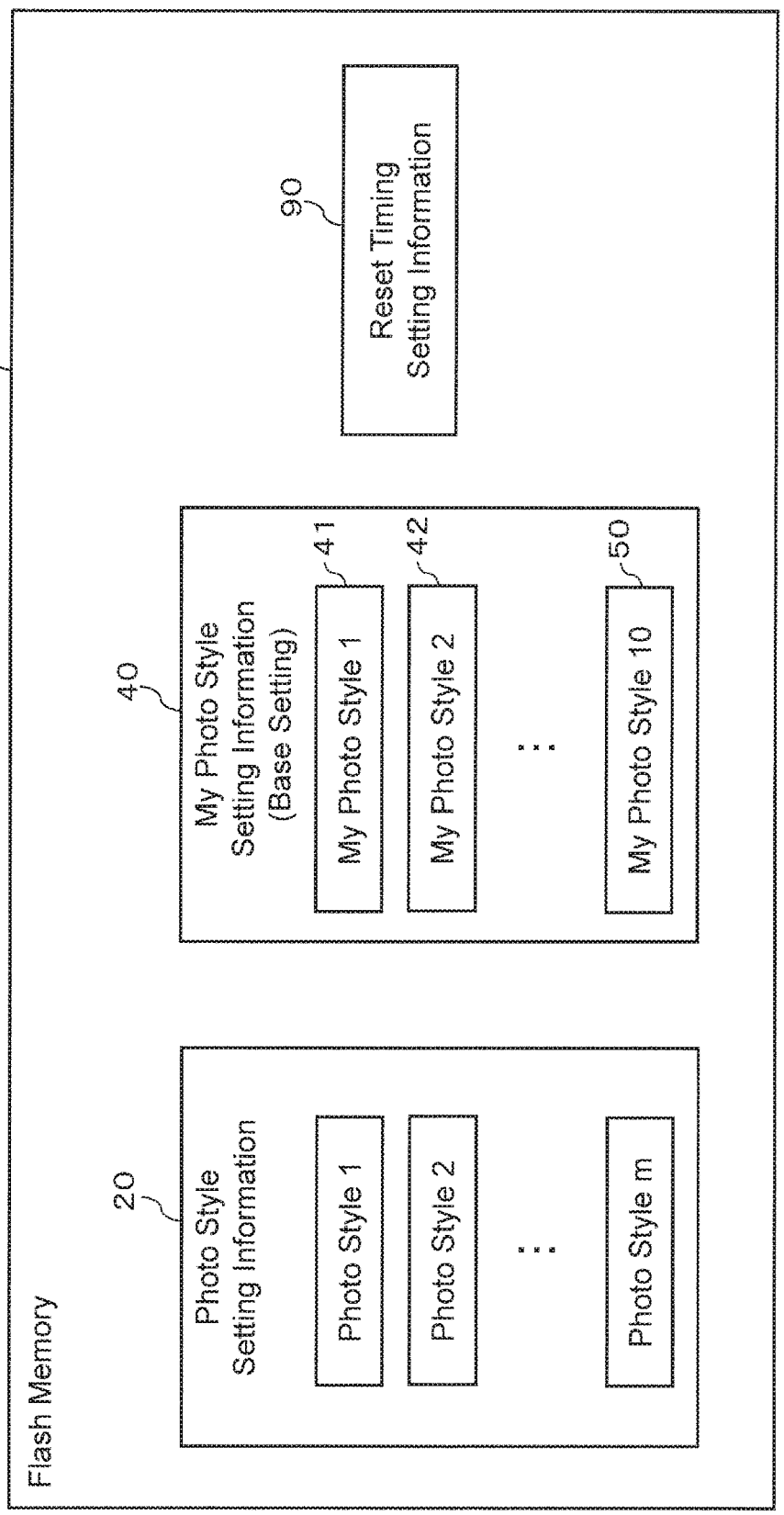
FIG. 4 is a diagram explaining photo style setting information and my photo style setting information stored in the digital camera.

In the digital camera 100, the photo style and the my photo style are managed as photo style setting information and my photo style setting information, respectively. These pieces of information are stored in the flash memory 145 of the digital camera 100. FIG. 4 is a diagram explaining the photo style setting information and the my photo style setting information stored in the flash memory 145.

Furthermore, in the digital camera 100 according to the present embodiment, the registered setting of the my photo style can be temporarily changed in accordance with the user's preference. For example, the user may want to finely adjust control parameters in accordance with a situation at a shooting site. In such a case, the setting of the my photo style can be temporarily changed in accordance with the user's preference. The temporarily changed setting of the my photo style is to be returned to an original setting at a predetermined timing designated by the user.

Figure 5:
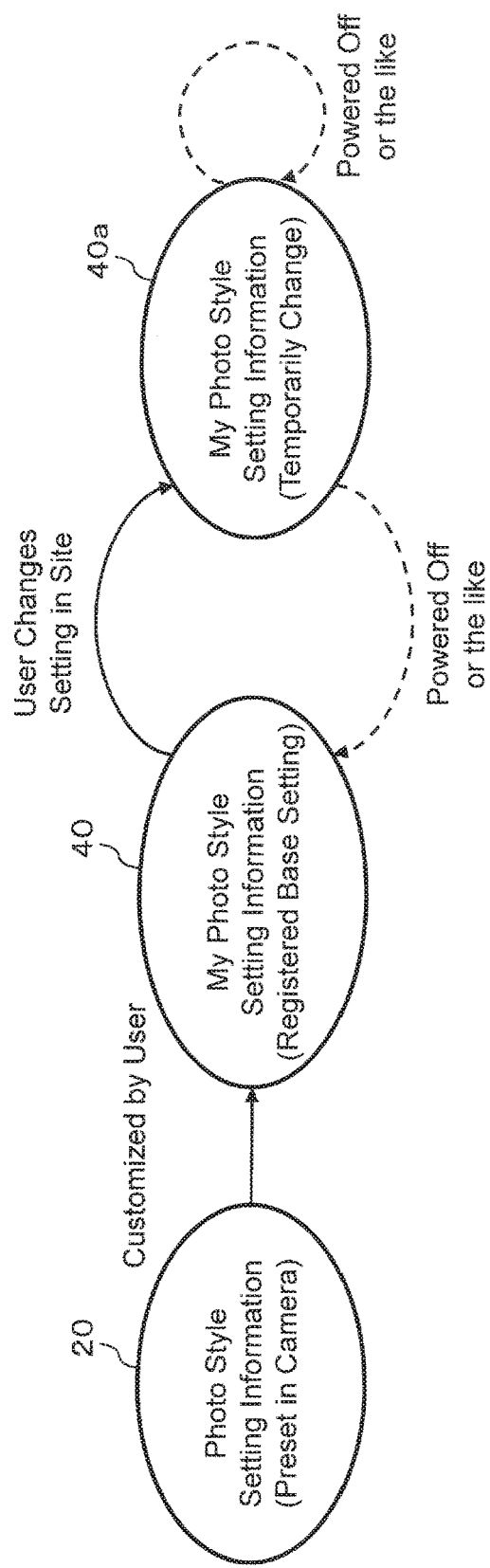
FIG. 5 is a diagram explaining the transition of setting information about the photo style.

FIG. 5 is a diagram explaining the transition between photo style setting information 20, my photo style setting information 40, and my photo style setting information 40*a* whose setting has been temporarily changed. The digital camera 100 stores the photo style setting information 20 set in advance. The user can change part of the contents of the photo style setting information 20 (that is, control parameters) in accordance with the user's preference. For example, with regard to the "natural" photo style, saturation and sharpness can be changed to user's favorite values. The photo style setting information 20 changed in accordance with the user's preference is registered in the digital camera 100 as the my photo style setting information 40.

Furthermore, the user can temporarily change (e.g., finely adjust) a part of the settings of the registered my photo style setting information 40 (hereinafter referred to as "base setting") in accordance with conditions of a shooting site etc. (a difference in weather such as sunny or cloudy or a balance of a color of each shooting subject). The temporarily changed my photo style setting information 40a is held in the digital camera 100. For example, when the digital camera 100 is powered off, the temporarily changed my photo style setting information 40a may be returned to the original base setting, or the setting may be maintained as it is. Whether the temporary change is returned to the base setting or maintained when the digital camera 100 is powered off or the like is based on the designation by the user.

Figure 6:
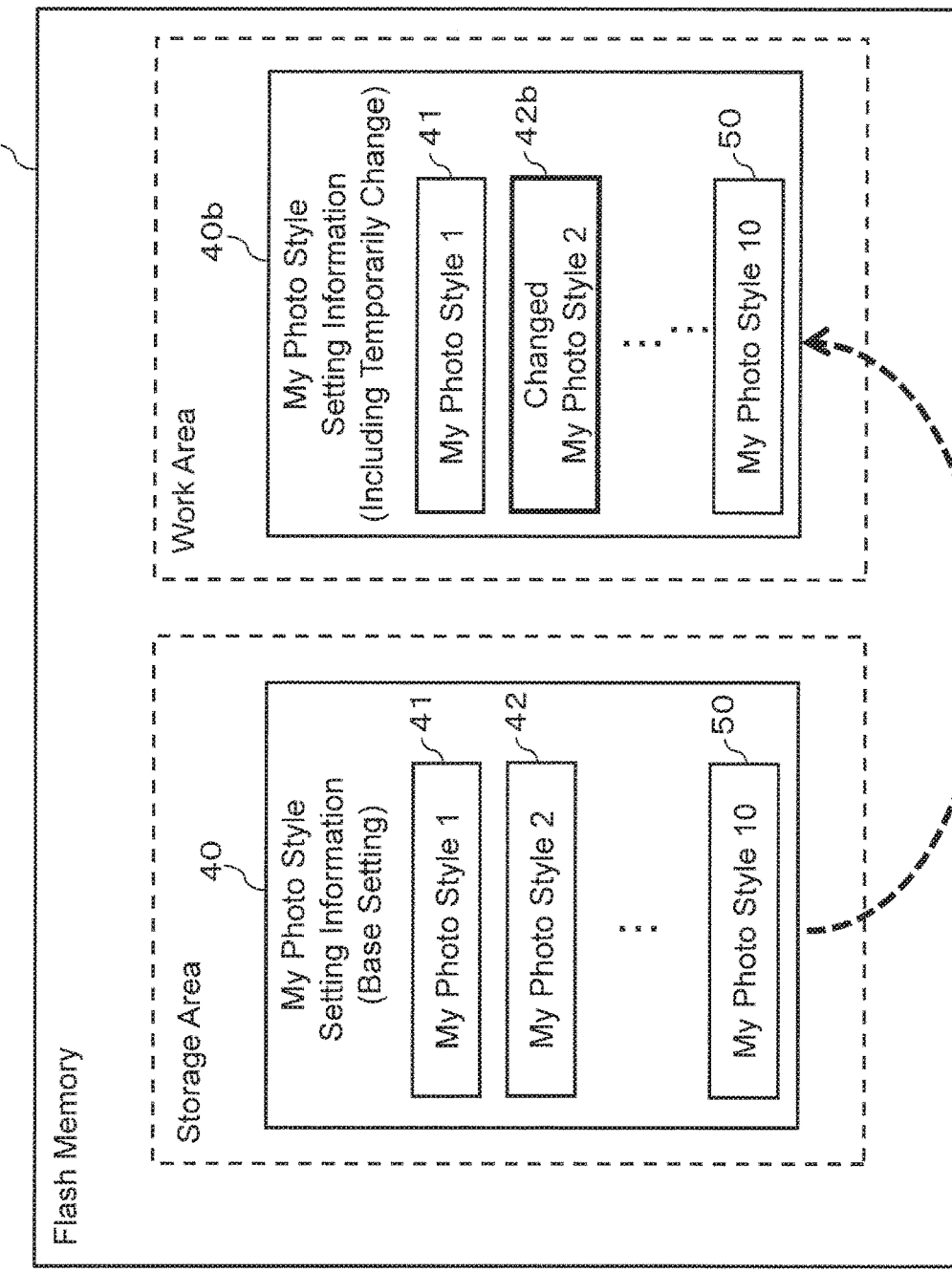
FIG. 6 is a diagram explaining the relationship between the my photo style setting information before change and the changed my photo style setting information.

FIG. 6 is a diagram explaining the storage state of the my photo style setting information in the flash memory 145. The my photo style setting information 40 generated and registered by the user based on the photo style setting information 20 is stored in the storage area of the flash memory 145. When one photo style is selected by the user, the my photo style setting information 40 related to the selected my photo style is copied to the work area. For example, my photo style is selected by the user through operation of a mode dial or a predetermined button.

With this, the my photo style setting information 40b is stored in the work area of the flash memory 145. Thereafter, when a part of the setting of the my photo style is changed by the user, the my photo style setting information 40b stored in the work area is changed based on the change.

In the example of FIG. 6, a setting 42 related to a my photo style 2 is changed by the user, and the my photo style setting information 40b in the work area is changed in accordance with the change. That is, the my photo style setting information 40b includes a setting 42b related to the my photo style 2 after the change. In this manner, the change by the user is reflected in the my photo style setting information 40b in the work area.

It is considered that such a change of the my photo style setting information 40b is a temporary change, and the change is returned to the original setting (base setting) of the my photo style setting information 40 at a timing designated by the user.

In particular, in the present embodiment, the user can specify, for example, the following three timings as the timing for returning the my photo style setting information 40b to the original setting (base setting).

Figure 7:
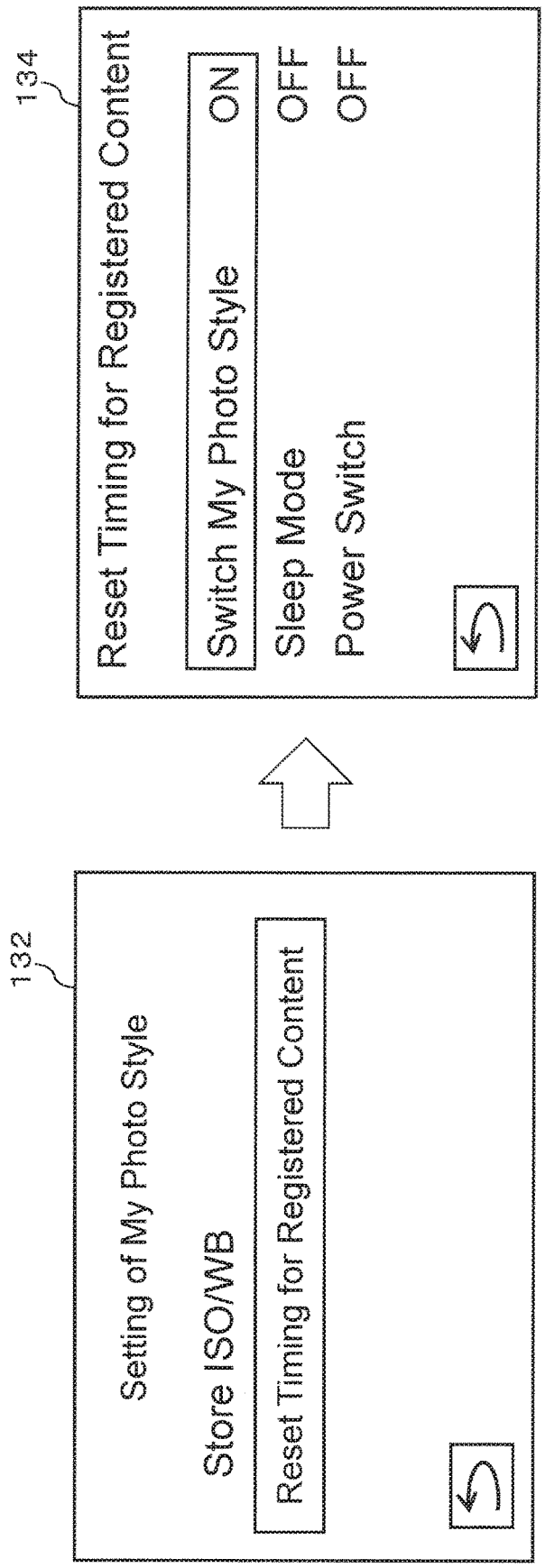
FIG. 7 is a diagram explaining a setting screen of reset timing to a registered content of the my photo style setting information.

1) When the digital camera 100 is tuned off
2) When the my photo style is switched
3) When the digital camera 100 is switched to the sleep mode FIG. 7 is a diagram explaining a setting screen for specifying the timing of resetting the my photo style setting information 40b whose setting has been changed to the original base setting (registration content).

As shown in FIG. 7, a setting screen 132 is a screen related to the setting of the my photo style, and is displayed on the liquid crystal monitor 130 as one of menu setting screens. When the user selects the item "Reset timing for registered content" on the setting screen 132, a setting screen 134 for setting the reset timing is displayed.

The item "switch my photo style" on the setting screen 134 is, for example, an item for setting whether or not the changed my photo style setting information 40b is returned to the base setting when the my photo style is switched to another my photo style through a mode dial operation. If "ON" is set, the my photo style setting information 40b is reset by switching the my photo style, and if "OFF" is set, the my photo style setting information 40b is maintained even if the my photo style is switched.

The item "sleep mode" is an item for setting whether or not the changed my photo style setting information 40b is changed to the base setting when the digital camera 100 is in the sleep mode. The item "power switch" is an item for setting whether or not the changed my photo style setting information 40b is returned to the base setting when the power switch of the digital camera 100 is operated (OFF operation or ON operation).

Figures 8, 9:
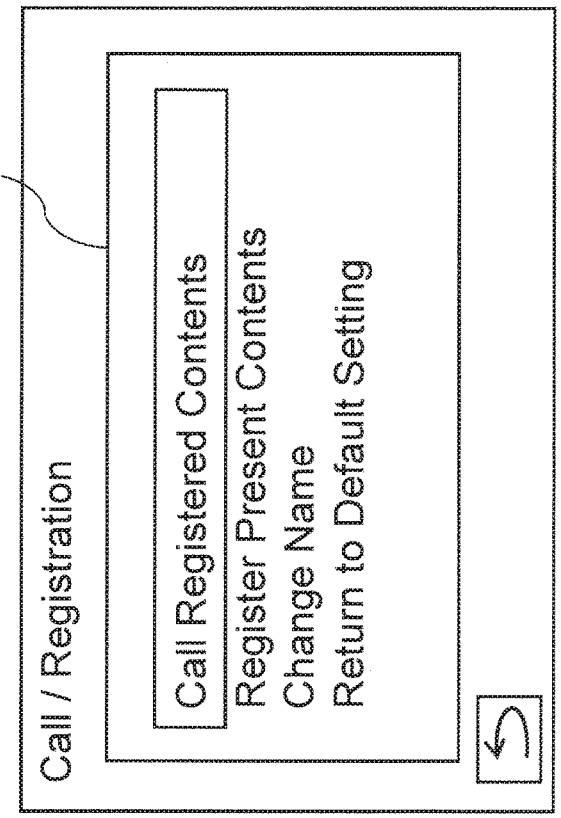
FIG. 8 is a diagram showing a configuration example of reset timing setting information.
FIG. 9 is a diagram explaining a menu screen for resetting the temporarily changed my photo style setting information to a base setting.

The contents set by the user on the setting screen 134 are stored in the flash memory 145 as reset timing setting information. FIG. 8 shows an example of the reset timing setting information.

In the setting screen 134 shown in FIG. 7, it is possible to set "OFF" for all or the three reset timings. However, in this case, there is a problem that the changed my photo style setting information 40b cannot be returned to the base setting.

Therefore, in the digital camera 100 according to the present embodiment, even if all of the three reset timings are OFF, it is possible to reset the change of the temporarily changed my photo style setting information 40b from the menu. Specifically, the controller 135 calls the screen of the temporarily changed my photo style from the menu of the digital camera 100, and further displays a call/registration menu 138 as shown in FIG. 9 on this screen. When the item "call registered contents" is selected on the call/registration menu 138, the setting of the temporarily changed my photo style setting information 40b is returned to the base setting. As described above, it is possible to return the temporarily changed my photo style setting information 40b to the base setting as needed by the user operation.

Figure 10:
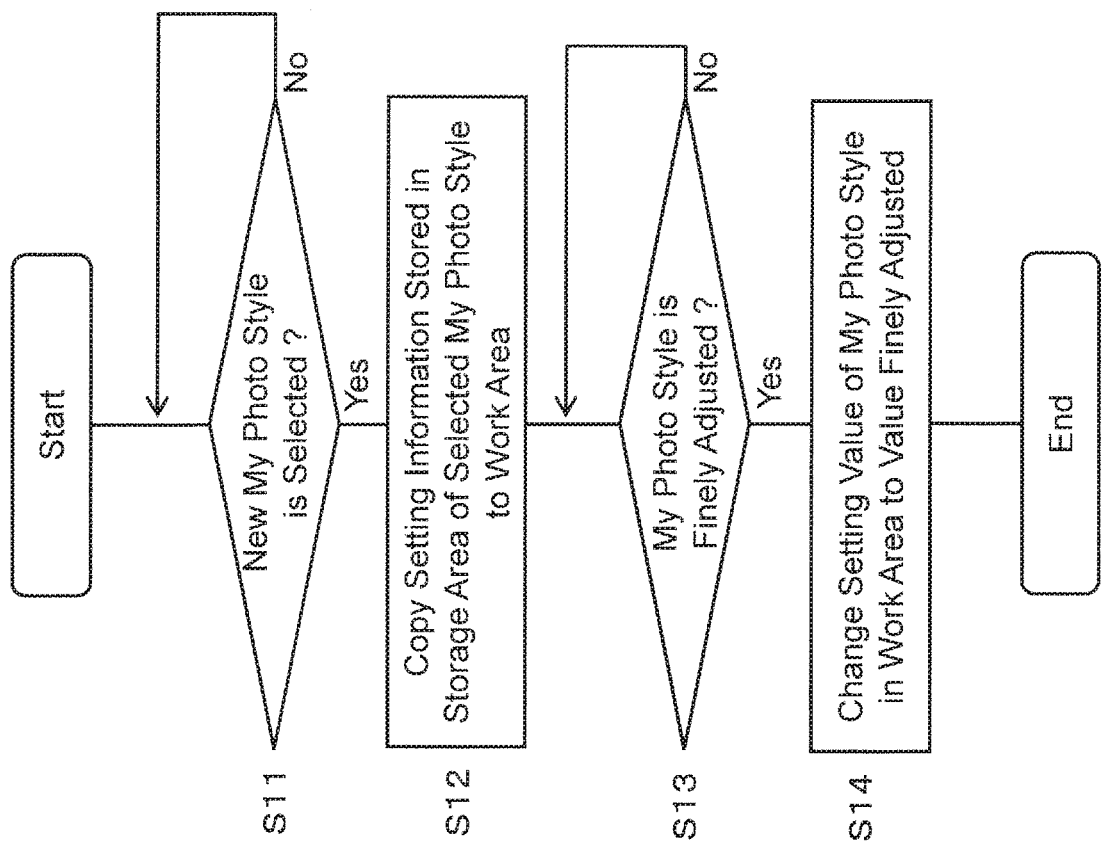
FIG. 10 is a flowchart showing processing executed by a controller when a my photo style function is selected.

FIG. 10 is a flowchart showing processing executed by the controller 135 when the my photo style is selected by the user.

The controller 135 determines whether a new my photo style has been selected by the user (S11). For example, the controller 135 determines whether a new my photo style has been selected based on an operation of a mode dial or a predetermined switch by the user.

If the new my photo style is selected (YES in S11), the controller 135 copies the setting information 40 (base setting) stored in the storage area of the selected my photo style to the work area (S12). When the my photo style is selected, and an image is to be shoot, the controller 135 refers to the my photo style setting information 40b stored in the work area, not in the storage area, to perform various settings related to the shooting operation.

Thereafter, when the setting of the my photo style is temporarily changed (finely adjusted) by the user in accordance with a situation at a shooting site (YES in S13), the controller 135 changes the setting value corresponding to the change in the my photo style setting information 40b stored in the work area to a value finely adjusted (customized) by the user (S14). The controller 135 can perform image capturing based on the setting reflecting the temporary change by referring to the my photo style setting information 40b held in the work area.

Figure 11:
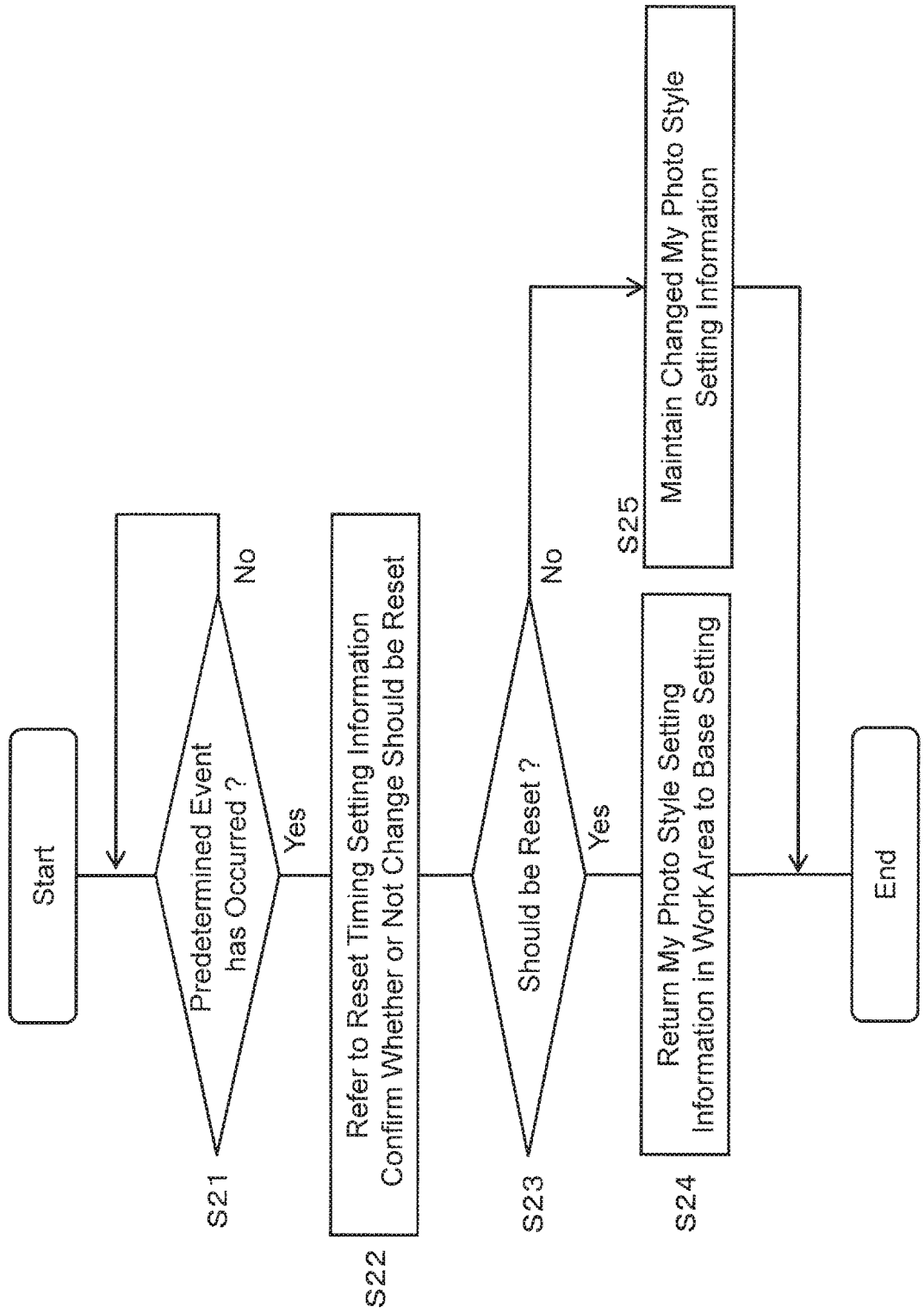
FIG. 11 is a flowchart showing reset processing of the my photo style setting information to the registered content.

FIG. 11 is a flowchart showing reset processing of the my photo style setting information 40a whose setting has been changed, which is executed by the controller 135. The controller 135 detects whether or not a predetermined event has occurred (S21). Here, the predetermined event is an event related to the reset of the my photo style setting information 40a whose setting has been changed, and is, for example, the power on of the digital camera 100, return from the sleep mode, and switching of the my photo style. The controller 135 can refer to a reset timing setting information 136 to determine a predetermined event.

When the occurrence of a predetermined event is detected (YES in S21), the controller 135 refers to the reset timing setting information 136 stored in the flash memory 145, and confirms whether or not the change of the my photo style setting information 40a should be reset based on the detected event (S22).

For example, if the detected predetermined event is "switching of my photo style", referring to the reset timing setting information 136 shown in FIG. 8, the controller 135 determines that the change of the my photo style setting information 40b should be reset. In contrast, if the detected predetermined event is "return from sleep mode" or "power on", the controller 135 determines that the change of the my photo style setting information 40a should not be reset.

If it is determined that the reset is to be performed (YES in S23), the controller 135 returns the my photo style setting information 40b stored in the work area to the base setting (S24). Specifically, the controller 135 copies the my photo style setting information 40 stored in the storage area to the work area. That is, the my photo style setting information 40a stored in the work area is overwritten with the my photo style setting information 40 stored in the storage area. With this, the my photo style setting information 40b in the work area, which is referred to by the controller 135, is returned to the base setting.

If it is determined that the reset should not be performed (NO in S23), the controller 135 maintains the changed my photo style setting information 40a (S25).

As described above, the user can specify the timing at which the changed setting of the my photo style setting information 40a should be reset. With this, the timing for returning the setting of the my photo style setting information 40a temporarily changed by the user to the original setting can be set to a timing desired by the user, and the convenience of the user can be improved.

For example, when the user selects one of the registered my photo styles and then temporarily changes (finely adjusts) the selected my photo style, after the change, the digital camera 100 may be powered off until the shutter chance of the subject comes in order to save energy. In this case, when the shutter chance comes and the digital camera 100 is powered on, if the changed setting of the my photo style is restored, the user needs to change (finely adjust) the my photo style again, so that the convenience of the user is lost. Therefore, by setting the temporary change of the my photo style not to be reset when the power switch is operated on the setting screen 134 as shown in FIG. 7, it is possible to reduce the loss of the convenience of the user as described above.

[1-3. Effect, Etc.]

As described above, the digital camera 100 (an example of the imaging apparatus) according to the present embodiment is an imaging apparatus that allows the user to register the setting of the my photo style (an example of the predetermined function). The digital camera 100 includes the flash memory 145 (an example of a storage part) storing my the photo style setting information 40 including the base setting which is the content of the setting registered by the user regarding the setting of the my photo style, and the controller 135 that changes the my photo style setting information 40 in accordance with the instruction by the user, and then returns the contents of the changed my photo style setting information 40a and 40b to the base setting at a predetermined timing (power off, switching to sleep mode, etc.). The controller 135 sets a predetermined timing based on the instruction by the user.

The predetermined timing is, for example, at least one of the timing at which the power switch of the digital camera 100 is operated, the timing at which the digital camera 100 transitions to the sleep mode or the timing at which the digital camera 100 returns from the sleep mode, and the timing at which the operation mode is switched.

With the above configuration, the user can specify the timing for returning the temporary change in the setting of the my photo style to the original base setting, and the convenience of the user can be improved.

Second Embodiment

In the first embodiment, with regard to the setting of the my photo style, the configuration has been described in which the user can specify the timing for returning the setting temporarily changed by the user to the original base setting. Such control is not limited to the setting of the my photo style, but can be applied to other settings customized by the user in accordance with the user's preferences. This will be described below.

For example, the digital camera 100 has a custom mode that allows custom registrations of a plurality of settings including a photo style. In the custom mode, the user can collectively register a plurality of settings set in the digital camera 100.

Figure 12:
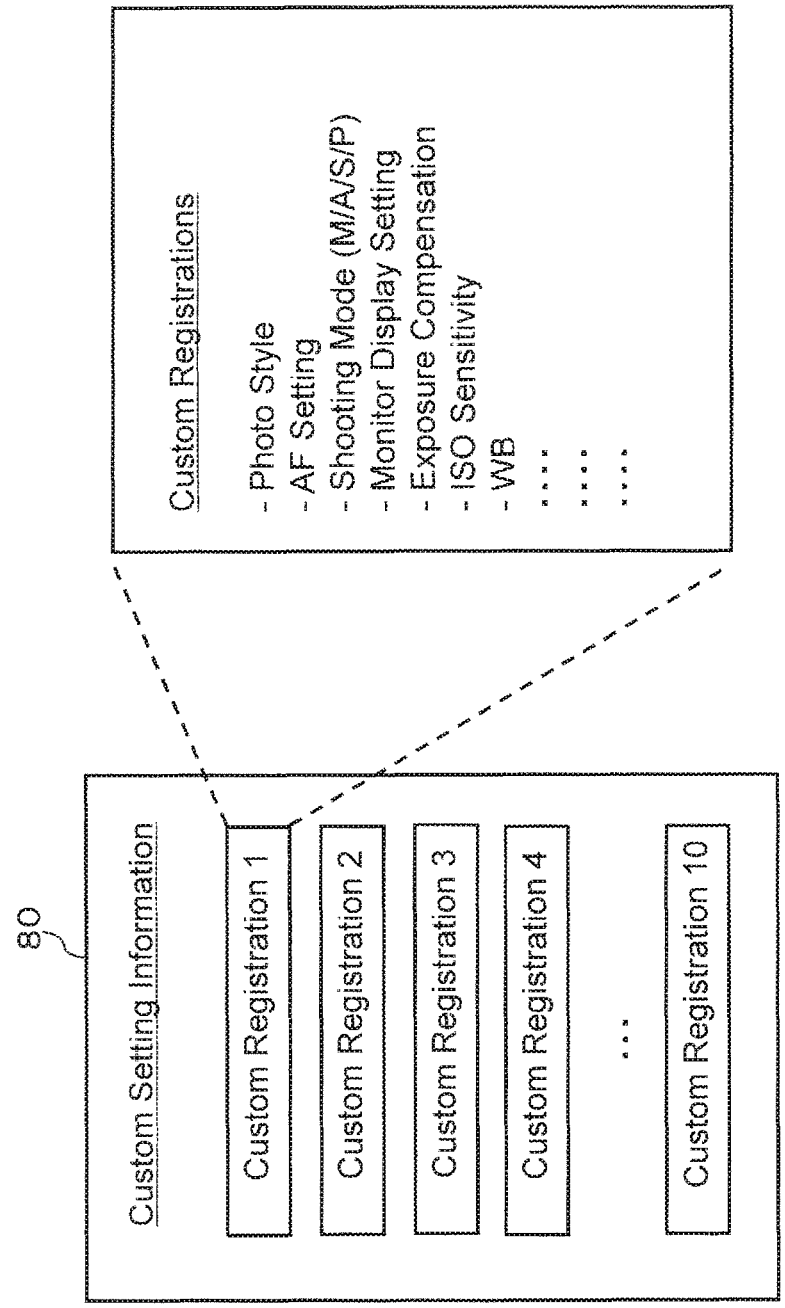
FIG. 12 is a diagram explaining custom setting information.

FIG. 12 is a diagram explaining custom setting information which is setting information on the custom mode. Custom setting information includes combinations of various settings including a photo style setting, an auto focus (AF) setting, a shooting mode (M/A/S/P), shutter speed, an aperture value, exposure compensation, ISO sensitivity, white balance (WB), and a monitor display setting. The user sets each setting (control parameter) such as a photo style setting, a setting related to an auto focus (switching between auto focus and manual focus, setting of type of auto focus, etc.), a shooting mode (M/A/SIP), etc. to a desired value and registers the settings in the digital camera 100 as a custom registration. For example, up to 10 custom registrations may be registered. The user can set the digital camera 100 to a desired setting by selecting a desired one of the registered custom registrations.

Further, the user can temporarily change the setting of this custom registration as in the case of the my photo style setting. Furthermore, the user can designate the timing of restoring the temporary change as in the case of the my photo style setting.

Figure 13:
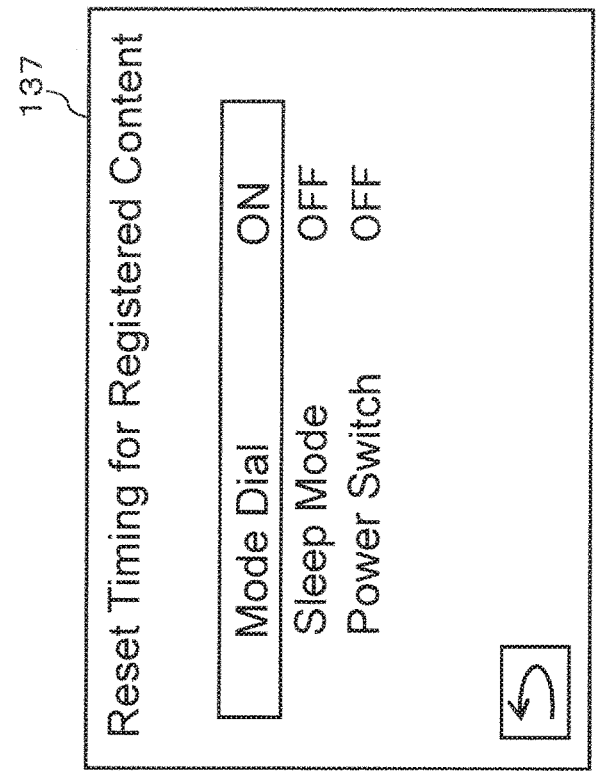
FIG. 13 is a diagram explaining a setting screen of reset timing to a registered content of the custom setting information.
Figure 13:
Figure 13:
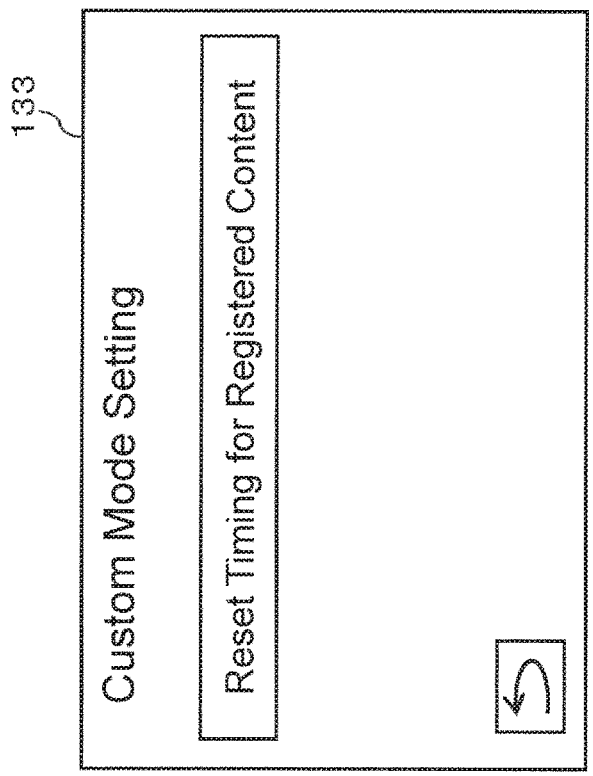

FIG. 13 is a diagram explaining a setting screen for specifying the timing of resetting the temporary change of the custom registration. When the user selects the item "Reset timing for registered content" on the setting screen 133, the liquid crystal monitor 130 displays a setting screen 137 for setting the reset timing. The item "mode dial" on the setting screen 137 is an item for setting whether or not the temporarily changed setting of the selected custom registration is returned to the original setting when the mode dial is operated. If the setting is returned to the original setting of the custom registration, set it to "ON", and if the changes are kept without returning to the original settings, set it to "OFF". The item "sleep mode" is an item for setting whether or not the temporarily changed setting of the custom registration is returned to the original setting when the digital camera 100 is switched to the sleep mode. The item "power switch" is an item for setting whether or not the temporarily changed setting of the custom registration is reset to the original setting when the power switch of the digital camera 100 is operated (powered on or off). The contents set by the user on the setting screen 137 are stored in the flash memory 145 as reset timing setting information in the custom mode.

With the above-described configuration, the user can specify the timing of restoring the temporary change in the setting of the custom registration as in the case of the my photo style setting.

Another Embodiment

As described above, the first embodiment has been described as an example of the technique disclosed in the present application. However, the technology in the present disclosure is not limited to this, and is applicable to embodiments in which changes, replacements, additions, omissions, and the like are appropriately made. Further, each component described in the first and second embodiments may be combined to make a new embodiment.

The setting of the my photo style setting and the custom registration is an example of the first setting. The first setting includes various digital camera settings that may be customized by the user in accordance with the user's preferences.

Although a digital camera has been described as an example of an imaging apparatus, the present invention is not limited to this. The imaging apparatus may be an electronic device (for example, a video camera, a smartphone, a tablet terminal, and the like) having an image capturing function and a communication function.

As described above, the embodiments have been described as an example of the technology in the present disclosure. To that end, the accompanying drawings and detailed description are provided.

Accordingly, some of the components described in the accompanying drawings and the detailed description may include not only essential components for solving the problem but also components which are not essential for solving the problem. Therefore, the fact that those non-essential components are described in the attached drawings and the detailed description should not immediately mean that those non-essential components are essential.

Further, the above-described embodiments are provided to illustrate the technique in the present disclosure, and hence it is possible to make various changes, replacements, additions, omissions, and the like within the scope of claims or the equivalent thereof.

The present disclosure is useful for an imaging apparatus that allows a user to set control parameters in accordance with the user's preference.

What is claimed is:

1. An imaging apparatus that allows a user to register a setting of a predetermined function, comprising:
    a non-transitory computer readable memory configured to store setting information including a base setting which is a content of the setting registered by the user regarding the setting of the predetermined function; and
    a processor configured to:
        generate modified setting information by changing the setting information in accordance with an instruction by the user;
        store the modified setting information in the non-transitory computer readable medium; and
        at a predetermined timing, return a content of the modified setting information to the base setting using the setting information,
    wherein the processor sets the predetermined timing based on an instruction by the user.

2. The imaging apparatus according to claim 1, wherein the predetermined timing includes at least one of a timing at which a power switch of the imaging apparatus is operated, a timing at which the imaging apparatus transitions to a sleep mode or a timing at which the imaging apparatus is returned from the sleep mode, and a timing at which an operation mode is switched.

3. The imaging apparatus according to claim 1, wherein the setting of the predetermined function includes a setting for setting hue and an image quality of a captured image.

4. The imaging apparatus according to claim 1, wherein the setting of the predetermined function includes at least one of a setting regarding an auto focus, a setting regarding a shooting mode, and a display setting of a display monitor.

5. The imaging apparatus according to claim 1, wherein
    the processor returns the content of the modified setting information to the base setting using the setting information at a first timing as the predetermined timing and prohibits returning a content of the modified setting information to the base setting using the setting information at a second timing, and
    the processor sets the first timing and the second timing based on an instruction by the user.

6. An imaging apparatus that allows a user to register a setting of a predetermined function, comprising:
    a non-transitory computer readable memory configured to store setting information including a base setting which is a content of the setting registered by the user regarding the setting of the predetermined function; and
    a processor configured to:
        generate modified setting information by changing the setting information in accordance with an instruction by the user;
        store the modified setting information in the non-transitory computer readable memory; and
        at a predetermined timing, prohibit returning a content of the modified setting information to the base setting using the setting information,
    wherein the processor sets the predetermined timing based on an instruction by the user.

7. The imaging apparatus according to claim 6, wherein
    the processor returns the content of the modified setting information to the base setting using the setting information at a first timing and prohibit returning a content of the modified setting information to the base setting using the setting information at a second timing as the predetermined timing, and
    the processor sets the first timing and the second timing based on an instruction by the user.

8. The imaging apparatus according to claim 6, wherein the predetermined timing includes at least one of a timing at which a power switch of the imaging apparatus is operated, a timing at which the imaging apparatus transitions to a sleep mode or a timing at which the imaging apparatus is returned from the sleep mode, and a timing at which an operation mode is switched.

9. The imaging apparatus according to claim 6, wherein the setting of the predetermined function includes a setting for setting hue and an image quality of a captured image.

10. The imaging apparatus according to claim 6, wherein the setting of the predetermined function includes at least one of a setting regarding an auto focus, a setting regarding a shooting mode, and a display setting of a display monitor.

* * * * *